United States Patent
Sato et al.

(10) Patent No.: US 9,920,945 B2
(45) Date of Patent: Mar. 20, 2018

(54) AIR-CONDITIONING CONTROL APPARATUS, AIR-CONDITIONING CONTROL SYSTEM, AND AIR-CONDITIONING CONTROL METHOD

(71) Applicant: Mitsubishi Electric Corporation, Chiyoda-ku (JP)

(72) Inventors: Fuyuki Sato, Tokyo (JP); Yosuke Kaneko, Tokyo (JP)

(73) Assignee: Mitsubishi Electric Corporation, Chiyoda-ku (JP)

( * ) Notice: Subject to any disclaimer, the term of this patent is extended or adjusted under 35 U.S.C. 154(b) by 220 days.

(21) Appl. No.: 14/767,205

(22) PCT Filed: Feb. 20, 2014

(86) PCT No.: PCT/JP2014/000869
§ 371 (c)(1),
(2) Date: Aug. 11, 2015

(87) PCT Pub. No.: WO2014/155951
PCT Pub. Date: Oct. 2, 2014

(65) Prior Publication Data
US 2016/0084515 A1   Mar. 24, 2016

(30) Foreign Application Priority Data
Mar. 29, 2013   (JP) ................... 2013-071396

(51) Int. Cl.
*F24F 11/00* (2006.01)
*F24F 11/08* (2006.01)
(Continued)

(52) U.S. Cl.
CPC .............. *F24F 11/006* (2013.01); *F24F 1/02* (2013.01); *F24F 11/0012* (2013.01);
(Continued)

(58) Field of Classification Search
CPC ........ F24F 11/006; F24F 11/0076; F24F 1/02; F24F 11/0012; F24F 2011/0063;
(Continued)

(56) References Cited

U.S. PATENT DOCUMENTS 7,644,869 B2 * 1/2010 Hoglund ................ F24F 11/006
236/46 C
8,452,457 B2 * 5/2013 Matsuoka ........... H04L 12/2825
236/46 R
(Continued)

FOREIGN PATENT DOCUMENTS

JP   55-116040 A   9/1980
JP   59-97442 A   6/1984
(Continued)

OTHER PUBLICATIONS

International Search Report dated May 27, 2014 in PCT/JP14/000869 Filed Feb. 20, 2014.
(Continued)

*Primary Examiner* — Charles Kasenge
(74) *Attorney, Agent, or Firm* — Oblon, McClelland, Maier & Neustadt, L.L.P.

(57) ABSTRACT

An air-conditioning control apparatus controlling a plurality of air conditioners calculates an adjustment time for adjusting a temperature of an area to be adjusted by the air conditioners to be controlled to between a desired temperature and an allowable temperature, generates a control schedule based on the adjustment time, and controls the air conditioners with the generated control schedule, instead of controlling with a preset stop time which is fixed, in order to bring the temperature around the air conditioners to the desired temperature. Thus, the air conditioners can be made to stop heat exchange before the desired temperature is reached, so that power consumption can be reduced.

6 Claims, 13 Drawing Sheets

(51) Int. Cl.
*F24F 1/02* (2011.01)
*G05B 15/02* (2006.01)
*G05D 23/19* (2006.01)

(52) U.S. Cl.
CPC .......... *F24F 11/0076* (2013.01); *G05B 15/02* (2013.01); *G05D 23/1919* (2013.01); *F24F 11/085* (2013.01); *F24F 2011/0046* (2013.01); *F24F 2011/0047* (2013.01); *F24F 2011/0057* (2013.01); *F24F 2011/0063* (2013.01); *F24F 2011/0064* (2013.01); *F24F 2011/0067* (2013.01); *F24F 2011/0068* (2013.01); *F24F 2011/0073* (2013.01); *F24F 2011/0075* (2013.01)

(58) Field of Classification Search
CPC ....... F24F 2011/0057; F24F 2011/0046; F24F 2011/0067; F24F 11/085; F24F 2011/0064; F24F 2011/0068; F24F 2011/0073; F24F 2011/0047; F24F 2011/0075; G05B 15/02; G05D 23/1919
See application file for complete search history.

(56) References Cited

U.S. PATENT DOCUMENTS

| | | | | |
|---|---|---|---|---|
| 8,554,376 B1* | 10/2013 | Matsuoka | ........... | H04L 12/2825 236/46 R |
| 8,600,561 B1* | 12/2013 | Modi | ................... | F24F 11/0012 219/502 |
| 8,630,742 B1* | 1/2014 | Stefanski | ............... | H05B 1/028 700/14 |
| 8,761,946 B2* | 6/2014 | Matsuoka | ........... | H04L 12/2825 236/46 R |
| 9,002,526 B2* | 4/2015 | Matsuoka | ........... | H04L 12/2825 236/46 R |
| 9,448,568 B2* | 9/2016 | Matsuoka | ........... | H04L 12/2825 |
| 2012/0131504 A1* | 5/2012 | Fadell | .................. | F24F 11/0086 715/810 |
| 2013/0103621 A1* | 4/2013 | Matsuoka | ........... | H04L 12/2825 706/12 |
| 2013/0338839 A1* | 12/2013 | Rogers | ............... | G05D 23/1917 700/278 |
| 2014/0094972 A1* | 4/2014 | Matsuoka | ........... | H04L 12/2825 700/276 |
| 2014/0236360 A1* | 8/2014 | Matsuoka | ........... | H04L 12/2825 700/276 |

FOREIGN PATENT DOCUMENTS

| | | |
|---|---|---|
| JP | 2006-38334 A | 2/2006 |
| JP | 2006-105571 A | 4/2006 |
| JP | 2007-315613 A | 12/2007 |
| JP | 2008-92320 A | 4/2008 |
| JP | 2008-175466 A | 7/2008 |
| JP | 2010-2065 A | 1/2010 |

OTHER PUBLICATIONS

Office Action dated Jun. 12, 2017 in Chinese Patent Application No. 201480014214.2 (with English language translation and English language translation of categories of cited documents).

* cited by examiner

Fig. 6

| | OPTIMAL HEAT ON TIME t1 | OPTIMAL HEAT OFF TIME t2 |
|---|---|---|
| CONTROL GROUP 6a | 5 MINUTES | 15 MINUTES |
| CONTROL GROUP 6b | 10 MINUTES | 5 MINUTES |
| ⋮ | ⋮ | ⋮ |

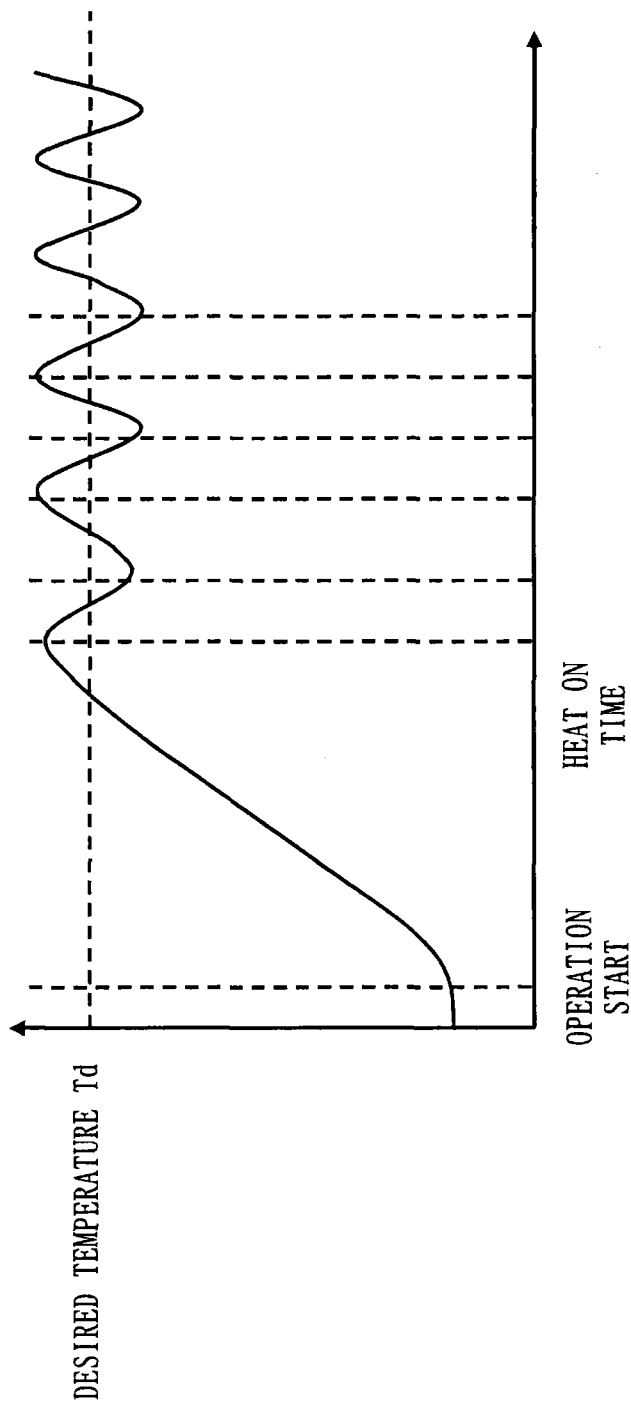

AIR-CONDITIONING CONTROL APPARATUS, AIR-CONDITIONING CONTROL SYSTEM, AND AIR-CONDITIONING CONTROL METHOD

TECHNICAL FIELD

The present invention relates to an air-conditioning control apparatus, an air-conditioning control system, and an air-conditioning control method for controlling air conditioners.

BACKGROUND ART

Conventionally, when a plurality of cooling instruments (including air-conditioning) are installed in the same floor, it has been proposed to control the plurality of cooling instruments appropriately by a control apparatus which is installed in one place, instead of controlling these cooling instruments separately (for example, Patent Literature 1).

In this conventional control apparatus, in order to perform operation according to the heat load around each cooling instrument, a stop time is preset for each cooling instrument. The value of this stop time is adjusted when each cooling instrument is installed, and then the value is used without being changed. The control apparatus that controls each cooling instrument is provided with a periodic time setting timer which is common to all the cooling instruments being connected, and the timer can be adjusted variably by a user. Therefore, when the heat load increases due to a change in the season, for example, it is controlled such that a desired temperature is achieved by increasing the periodic time common to all the cooling instruments and thus increasing the operating time.

CITATION LIST

Patent Literature

Patent Literature 1: JP 1401409 B

SUMMARY OF INVENTION

Technical Problem

However, in the conventional air-conditioning control apparatus, when the heat load increases depending on the time of the day due to effects of insolation, the number of people in the room, or equipment usage conditions, for example, the operating time in which heat exchange is performed has to be increased in order to bring the temperature of the room (room temperature) around a certain cooling instrument to the desired temperature, because the stop time which is preset for each instrument is fixed. As a result, excessive power is consumed.

Solution to Problem

An air-conditioning control apparatus according to the present invention includes a temperature measurement unit that obtains a temperature of a temperature sensor installed in a same area as an air conditioner, based on time information which is set; an adjustment time calculation unit that calculates an adjustment time in which the air conditioner is controlled to adjust the temperature obtained by the temperature measurement unit to between a desired temperature which is set and an allowable temperature which is set as an allowable deviation from the desired temperature, using the time information at which the temperature is obtained; and a schedule generation unit that generates a control schedule for controlling the air conditioner, based on the adjustment time calculated by the adjustment time calculation unit.

Advantageous Effects of Invention

According to the present invention, an adjustment time is calculated for adjusting a temperature of an area to be adjusted by controlling air conditioners to between a desired temperature and an allowable temperature, and a control schedule for controlling the air conditioners is generated based on the adjustment time. Thus, the air conditioners can be made to stop heat exchange before the desired temperature is reached, so that power consumption can be reduced.

BRIEF DESCRIPTION OF DRAWINGS

FIG. 6 illustrates an example of adjustment times that are calculated by the adjustment time calculation unit 13 according to the embodiment of the present invention;

FIG. 13 is a diagram illustrating a temperature state when the air conditioners 4 are operated by a conventional air-conditioning control apparatus.

DESCRIPTION OF EMBODIMENT

An embodiment of an air-conditioning control apparatus, an air-conditioning control system, and an air-conditioning control method according to the present invention will be described in detail hereinafter with reference to the drawings. Note that the present invention is not limited to this embodiment.

Embodiment

Figure 1:
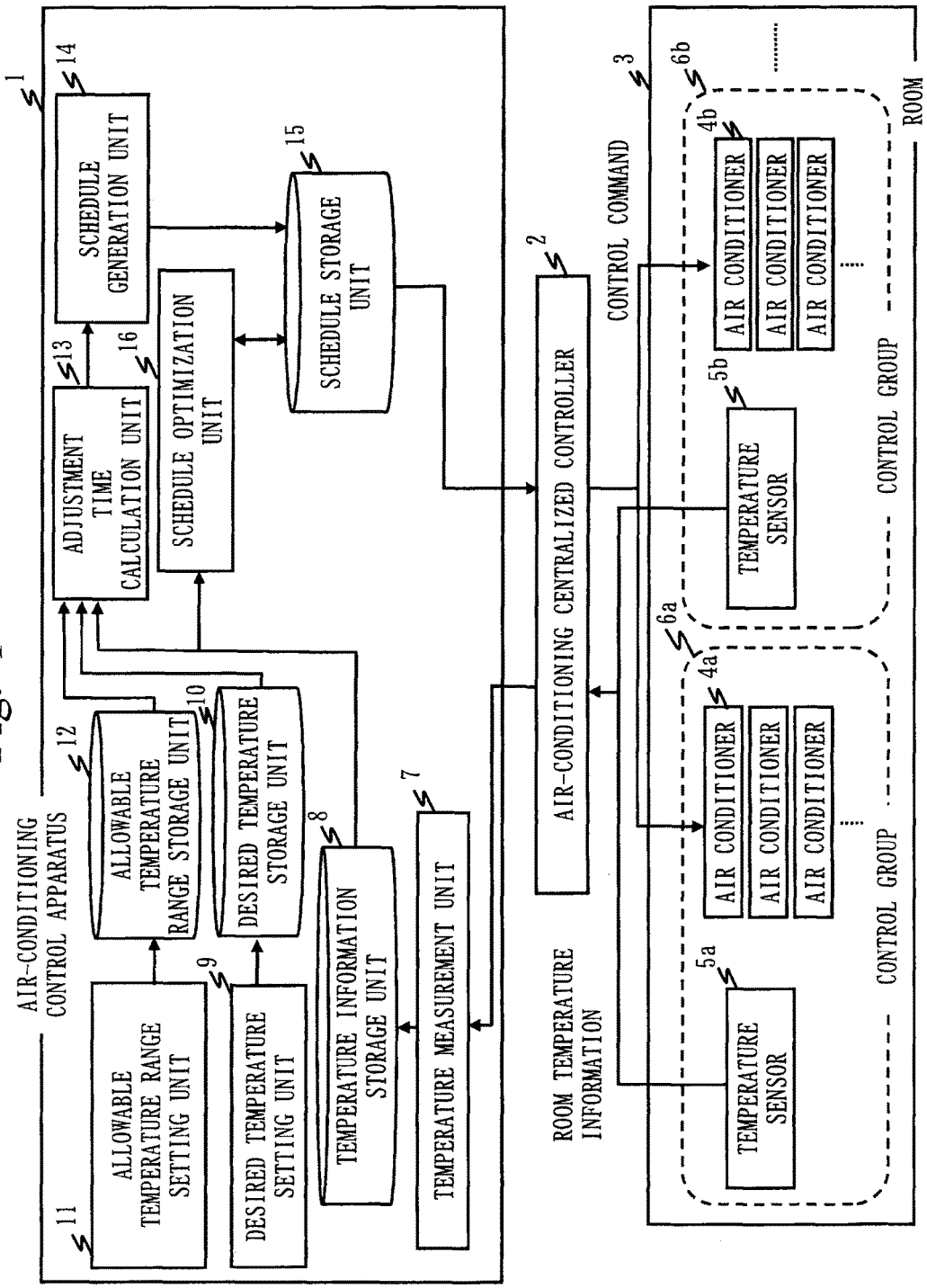
FIG. 1 is a configuration diagram of an air-conditioning control apparatus 1 according to an embodiment of the present invention.

FIG. 1 is a configuration diagram of an air-conditioning control apparatus 1 according to an embodiment of the present invention.

The air-conditioning control apparatus 1 is mounted on a management server or a management terminal of a building management system (BMS) or a building and energy management system (BEMS), for example, and is connected with an air-conditioning centralized controller 2 with a dedicated line or a LAN (Local Area Network) cable.

The air-conditioning centralized controller 2 is installed in a room 3, and is connected with a plurality of air conditioners 4 to be controlled on a group basis and a temperature sensor 5 with dedicated lines or LAN cables.

The air-conditioning control apparatus 1 receives, via the air-conditioning centralized controller 2, a temperature around the air conditioners 4 of each control group 6 from the temperature sensor 5 installed in each control group 6, generates a control schedule for controlling the air conditioners 4, and transmits the generated control schedule to the air-conditioning centralized controller 2.

The air-conditioning centralized controller 2 obtains the temperature of the temperature sensor 5 installed in each control group 6, and controls the air conditioners 4 to achieve a preset desired temperature. The air-conditioning centralized controller 2 also transmits the obtained temperature of the temperature sensor 5 to the air-conditioning control apparatus 1, and outputs to the air conditioners 4 a control command to control the air conditioners 4 in accordance with the control schedule obtained from the air-conditioning control apparatus 1.

The air conditioners 4 are operated from the air-conditioning centralized controller 2 on a basis of each control group 6 to adjust the temperature of the room 3.

The temperature sensor 5 is installed in each control group 6, and measures a temperature of the room (room temperature) in an area of the control group 6 in which the temperature sensor 5 is installed. In response to a command from the air-conditioning centralized controller 2, the temperature sensor 5 transmits the measured temperature to the air-conditioning centralized controller 2.

The control group 6 is a logical group, and one or more air conditioners 4 and the temperature sensor 5 belong to one control group 6.

It is described herein that the air-conditioning control apparatus 1 is mounted on the management server or the management terminal of the BMS or the BEMS. Alternatively, the air-conditioning control apparatus 1 may be embedded in the air-conditioning centralized controller 2 as an embedded software module.

The configuration of the air-conditioning control apparatus 1 will now be described.

The air-conditioning control apparatus 1 is composed of a temperature measurement unit 7, a temperature information storage unit 8, a desired temperature setting unit 9, a desired temperature storage unit 10, an allowable temperature range setting unit 11, an allowable temperature range storage unit 12, an adjustment time calculation unit 13, a schedule generation unit 14, a schedule storage unit 15, and a schedule optimization unit 16.

The temperature measurement unit 7 obtains a room temperature of the area of each control group 6 from the temperature sensor 5 via the air-conditioning centralized controller 2 at predetermined time intervals or predetermined timings (preset time information), and outputs to the temperature information storage unit 8 the obtained temperature together with the obtained time (time information). The temperature measurement unit 7 also outputs to the temperature information storage unit 8 information on the control group 6 to which belongs the temperature sensor 5 from which the temperature has been obtained, by associating the information on the control group 6 with the temperature and the time.

The temperature information storage unit 8 stores the temperature, the time, and the information on the control group 6 of the temperature sensor 5 that are input from the temperature measurement unit 7, as temperature history information. The stored temperature history information is referred to from the adjustment time calculation unit 13 and the schedule optimization unit 16.

The desired temperature setting unit 9 is a user interface with which a user sets a desired temperature of the room temperature for each control group 6. The desired temperature that is set in the desired temperature setting unit 9 is output to the desired temperature storage unit 10.

The desired temperature storage unit 10 stores the desired temperature of the room temperature that is input from the desired temperature setting unit 9 for each control group 6. The stored desired temperature is referred to from the adjustment time calculation unit 13.

The allowable temperature range setting unit 11 is a user interface with which the user sets for each control group 6 a range of allowable temperatures (allowable temperature range) which specifies an allowable degree of deviation of the room temperature from the desired temperature when the room temperature is adjusted by the air conditioners 4. The allowable temperature range that is set in the allowable temperature range setting unit 11 is output to the allowable temperature range storage unit 12.

The allowable temperature range storage unit 12 stores the allowable temperature range that is input from the allowable temperature range setting unit 11 for each control group 6. The stored allowable temperature range is referred to from the adjustment time calculation unit 13.

The adjustment time calculation unit 13 calculates an adjustment time based on the temperature history information of a certain period on each control group 6 that is obtained from the temperature information storage unit 8, the desired temperature of each control group 6 that is obtained from the desired temperature storage unit 10, and the allowable temperature range of each control group 6 that is obtained from the allowable temperature range storage unit 12.

The adjustment time is a time in which the air conditioners 4 are controlled on the basis of each control group 6 to adjust the temperature of the area to be adjusted by the air conditioners 4 to between the desired temperature and an allowable temperature. For example, there may be a time in a state in which the air conditioners 4 are operating and heat exchange is performed from the allowable temperature before reaching the desired temperature to the desired temperature (heat ON), and a time in a state in which heat exchange is not performed from the desired temperature to the allowable temperature after reaching the desired temperature (heat OFF).

A heat ON time from the allowable temperature before reaching the desired temperature to the desired temperature will be referred to as an optimal heat ON time, and a heat OFF time from the desired temperature to the allowable temperature after reaching the desired temperature will be referred to as an optimal heat OFF time herein.

The adjustment time calculation unit 13 outputs to the schedule generation unit 14 the optimal heat ON time and the optimal heat OFF time that are calculated for each control group 6, for example, as adjustment times.

The schedule generation unit 14 generates a control schedule for the air conditioners 4 based on the adjustment times for each control group 6 that are input from the adjustment time calculation unit 13, and outputs the generated control schedule to the schedule storage unit 15.

The control schedule is generated with a sequence of information consisting of an optimal heat ON time t1, a control timing for the air conditioners 4 to stop heat exchange, an optimal heat OFF time t2, and a control timing for the air conditioners 4 to perform heat exchange, the sequence being repeated.

The schedule storage unit 15 stores the control schedule for the air conditioners 4 that is input from the schedule generation unit 14 for each control group 6. The stored control schedule is referred to from the air-conditioning centralized controller 2.

The schedule optimization unit 16 updates the control schedule stored in the schedule storage unit 15 to an optimal control schedule, based on the control schedule obtained from the schedule storage unit 15 and the temperature history information obtained from the temperature information storage unit 8.

The optimal control schedule is, for example, a control schedule for a plurality of the control groups 6 in order to maintain the temperature at the allowable temperature range from the desired temperature in accordance with temperature effects from the air conditioners 4 of each adjacent control group 6 and temperature changes due to insolation to the area of each control group 6, the number of people in the room, and heat from equipment.

It is described that the temperature sensor 5 is connected with the air-conditioning centralized controller 2 with a dedicated line or a LAN cable. Alternatively, the temperature sensor 5 may be connected with the air-conditioning centralized controller 2 wirelessly (Bluetooth (registered trademark) or a specified low power radio station). Alternatively, the temperature sensor 5 may be connected directly with the temperature measurement unit 7 of the air-conditioning control apparatus 1 without involving the air-conditioning centralized controller 2.

The operation of the air-conditioning control apparatus 1 will now be described.

Figure 2:
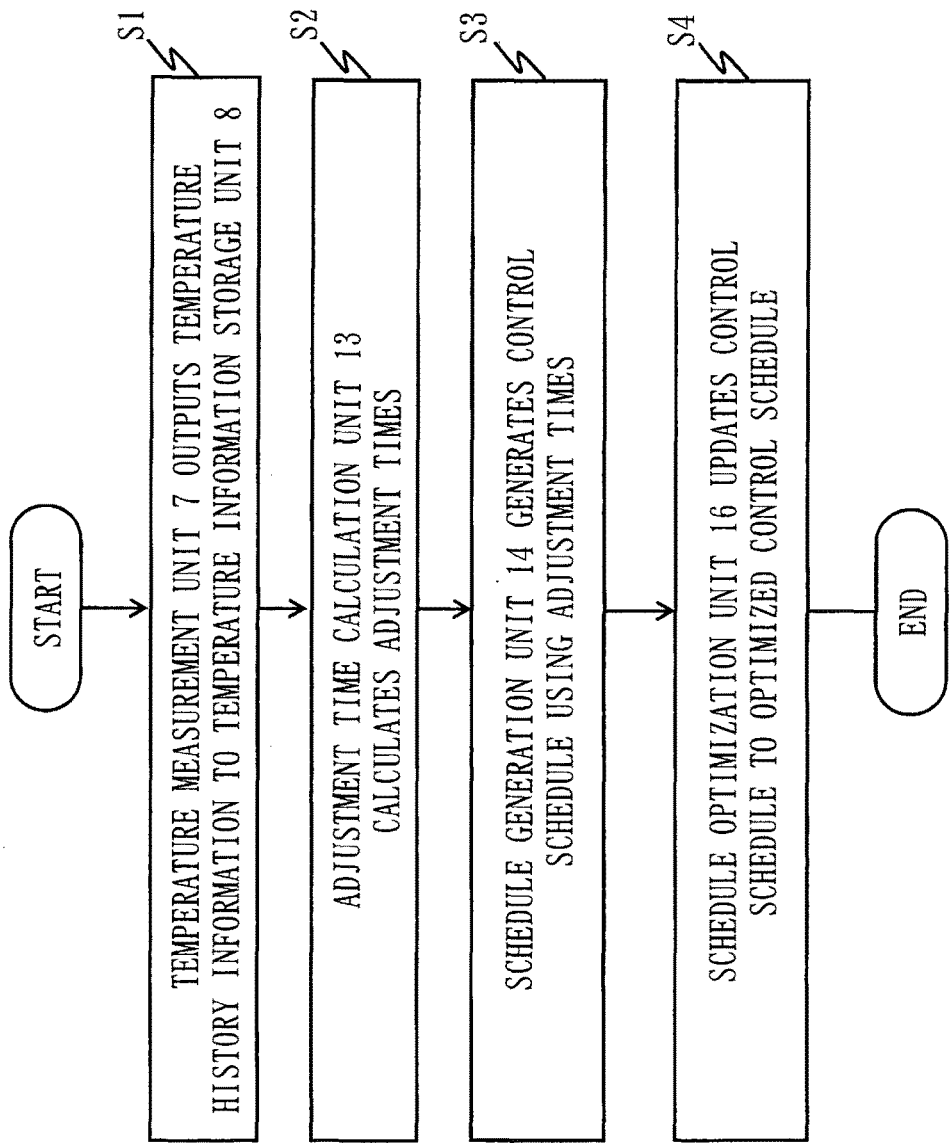
FIG. 2 is a flowchart illustrating the operation of the air-conditioning control apparatus 1 according to the embodiment of the present invention.

FIG. 2 is a flowchart illustrating the operation of the air-conditioning control apparatus 1 according to the embodiment of the present invention.

Among the following operation, calculation of adjustment times by the adjustment time calculation unit 13 and generation of a control schedule by the schedule generation unit 14 are performed, for example, once at start of operation of the air conditioners 4 when the air conditioners 4 are installed. Updating of the control schedule to a control schedule optimized by the schedule optimization unit 16 is performed with arbitrary timing while the air conditioners 4 are operating.

First, the temperature measurement unit 7 obtains a value of the temperature sensor 5 from the temperature sensor 5 on a preset time basis, for example. The temperature measurement unit 7 outputs to the temperature information storage unit 8, as temperature history information, the obtained time and the obtained temperature together with information on the control group to which belongs the temperature sensor 5 from which the temperature has been obtained (Step (hereinafter S) 1).

At this time, it is assumed that a desired temperature of the room temperature has been set from the desired temperature setting unit 9 and stored in the desired temperature storage unit 10, and that an allowable temperature range has been set from the allowable temperature range setting unit 11 and stored in the allowable temperature range storage unit 12.

The adjustment time calculation unit 13 obtains the temperature history information from the temperature information storage unit 8, the desired temperature from the desired temperature storage unit 10, and the allowable temperature range from the allowable temperature range storage unit 12. Based on the room temperature history information, the desired temperature, and the allowable temperature range that have been obtained, the adjustment time calculation unit 13 calculates adjustment times for adjusting the room temperature to the allowable temperature range from the desired temperature for each control group 6 (S2).

The operation of the adjustment time calculation unit 13 will be described in detail later.

The adjustment time calculation unit 13 outputs the calculated adjustment times to the schedule generation unit 14.

The schedule generation unit 14 generates a control schedule for controlling the air conditioners 4 on the basis of each control group 6, using the adjustment times that are input from the adjustment time calculation unit 13 (S3).

The operation of the schedule generation unit 14 will be described in detail later.

The schedule generation unit 14 outputs the generated control schedule to the schedule storage unit 15.

The schedule optimization unit 16 updates the control schedule stored in the schedule storage unit 15 to an optimized schedule using the temperature history information in the temperature information storage unit 8 (S4).

The operation of the schedule optimization unit 16 will be described in detail later.

The above is an outline of the operation of the air-conditioning control apparatus 1.

The control schedule generated and optimized in the air-conditioning control apparatus 1 is obtained by the air-conditioning centralized controller 2. The air-conditioning centralized controller 2 controls the air conditioners 4 on the basis of each control group 6 in accordance with the obtained control schedule.

The operation of the adjustment time calculation unit 13 will now be described in detail.

A description will be given herein using a heating operation as an example.

Figure 3:
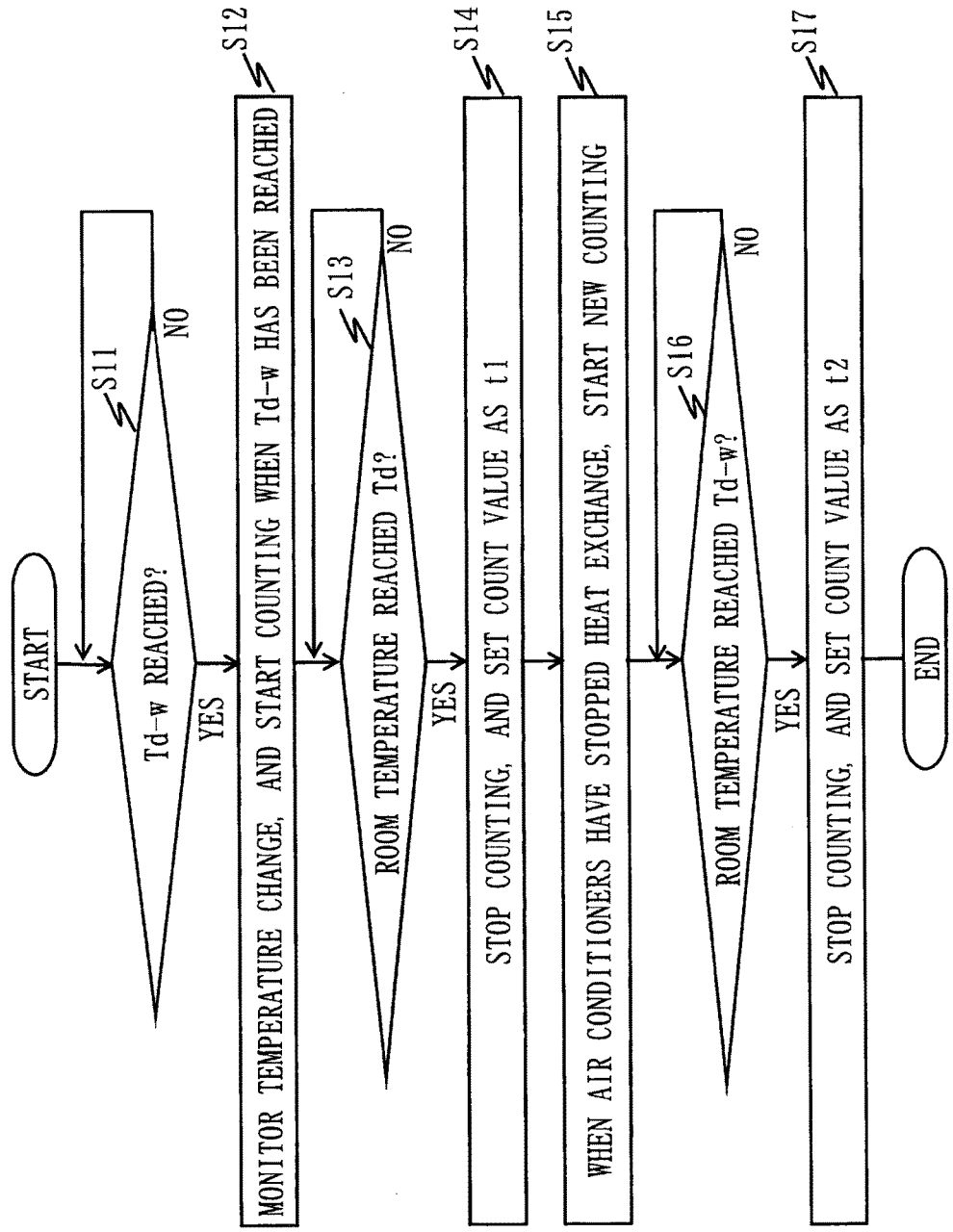
FIG. 3 is a flowchart illustrating the operation of an adjustment time calculation unit 13 of the air-conditioning control apparatus 1 according to the embodiment of the present invention.

FIG. 3 is a flowchart illustrating the operation of the adjustment time calculation unit 13 of the air-conditioning control apparatus 1 according to the embodiment of the present invention.

Figure 4:
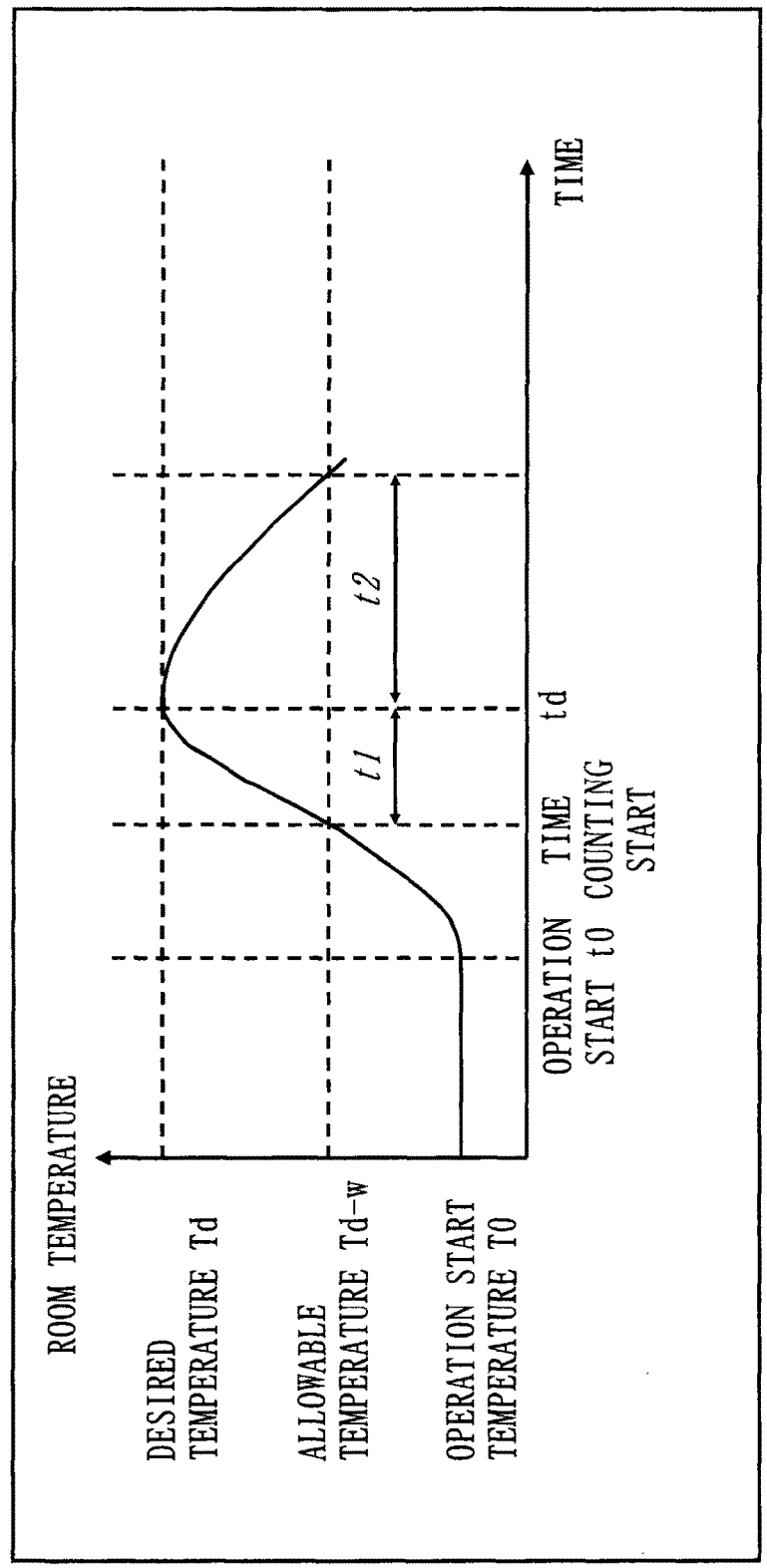
FIG. 4 is an explanatory diagram of calculation of an adjustment time by the adjustment time calculation unit 13 according to the embodiment of the present invention.

FIG. 4 is an explanatory diagram of calculation of an adjustment time by the adjustment time calculation unit 13 according to the embodiment of the present invention.

The adjustment time calculation unit 13 obtains the temperature history information from the temperature information storage unit 8, the desired temperature from the desired temperature storage unit 10, and the allowable temperature range from the allowable temperature range storage unit 12, and parameters as indicated below are set.

Td: desired temperature (° C.), w: allowable temperature range (° C.), t1: optimal heat ON time (minutes), t2: optimal heat OFF time (minutes).

In FIG. 4, T0 denotes the temperature when the air conditioners 4 start operating, Td−w denotes the allowable temperature at the allowable temperature range from the desired temperature, and Td denotes the desired temperature. Also note that t0 denotes the time when the air conditioners 4 start operating, and that td denotes the time when the desired temperature is reached.

When the air conditioners 4 start operating, heat is supplied from the air conditioners 4 to the area where the air conditioners 4 are installed, causing the room temperature in that area to increase.

First, when the air conditioners 4 start operating at time to, the adjustment time calculation unit 13 obtains a temperature T0 of the room at this time from the temperature information storage unit 8. Further, the adjustment time calculation unit 13 obtains a temperature of the room after time t0 from the temperature information storage unit 8 to determine whether or not the room temperature has reached (Td−w) (S11).

If it is determined that the room temperature has reached (Td−w), the optimal heat ON time starts to be counted (S12).

Until the room temperature reaches Td, a determination of whether or not the room temperature has reached Td is made (S13).

When the room temperature has reached Td, the counting of the time is stopped, and a required time for the room temperature to reach Td from (Td−w) is set as t1 (S14).

At this time, when the room temperature has reached Td, the air-conditioning centralized controller 2 outputs a command to stop heat exchange to the air conditioners 4.

When the air conditioners 4 have stopped heat exchange, the adjustment time calculation unit 13 starts counting the optimal heat OFF time (S15).

Then, the room temperature decreases gradually.

Until the room temperature reaches Td−w, the adjustment time calculation unit 13 makes a determination of whether or not the room temperature has reached (Td−w) (S16).

When the room temperature has reached (Td−w), the counting of the time is stopped, and a required time for the room temperature to reach (Td−w) from Td is set as t2 (S17).

In this way, the adjustment time calculation unit 13 calculates the optimal heat ON time t1 and the optimal heat OFF time t2.

The adjustment time calculation unit 13 calculates the optimal heat ON time t1 and the optimal heat OFF time t2 for each control group 6, in accordance with the environment, the desired temperature (Td), and the allowable temperature range (w) of each control group 6.

The above has described the operation of the adjustment time calculation unit 13.

This example presents a case where the room temperature changes from Td−w to Td. Alternatively, the optimal heat ON time t1 may be a time for the room temperature to change from Td−w to Td+w, and the optimal heat OFF time t2 may be a time for the room temperature to change from Td+w to Td−w.

To apply this example to cooling, a required time for the room temperature to change from Td+w to Td is set as t1, and a required time for the room temperature to change from Td to Td+w is set as t2.

It has been described in the above example that the adjustment time calculation unit 13 operates once at start of operation of the air conditioners 4. Alternatively, the adjustment time calculation unit 13 may operate periodically in a day. For example, depending on the time of the day, the temperature decreases or increases rapidly after the air conditioners 4 stop heat exchange in a perimeter zone (area near an outer wall and a window in the floor) which is susceptible to effects of insolation or the outside temperature. Thus, the adjustment times t1 and t2 may be calculated frequently.

Because daylight hours vary with the season, the schedule may be changed depending on the calculated adjustment times t1 and t2.

Further, adjustment times may be calculated frequently on weekdays, compared with a floor or hours (holidays) with few people present.

When adjustment times are calculated frequently, the air-conditioning centralized controller 2 controls the air conditioners 4 in accordance with a generated control schedule.

The operation of the schedule generation unit 14 to generate a control schedule will now be described.

The schedule generation unit 14 generates a control schedule using time information common to each control group 6 and the optimal heat ON time t1 and the optimal heat OFF time t2 that are calculated in the adjustment time calculation unit 13.

The time information common to each control group 6 is, for example, time information on the management server or management terminal on which the air-conditioning control apparatus 1 is mounted, and is used to synchronize timings of the control schedule of each control group 6.

The schedule generation unit 14 provides the time information common to each control group 6 to the optimal heat ON time t1 and the optimal heat OFF time t2 that are obtained from the adjustment time calculation unit 13, and generates a control schedule for each control group 6 by repeating the following sequence of information from the time when the allowable temperature has been reached: the optimal heat ON time t1, the control timing for the air conditioners 4 to stop heat exchange, the optimal heat OFF time t2, the control timing for the air conditioners 4 to perform heat exchange. The schedule generation unit 14 outputs the control schedule for each control group 6 to the schedule storage unit 15 for storage.

Figure 5:
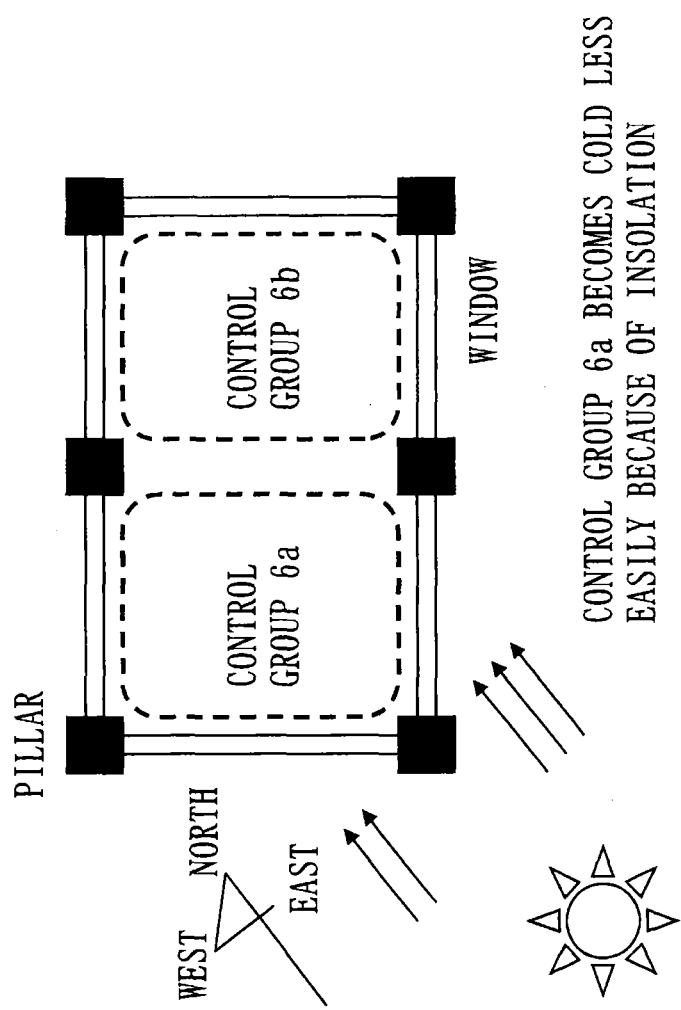
FIG. 5 is a diagram illustrating an example of a positional relation of control groups 6 to be controlled by the air-conditioning control apparatus 1 according to the embodiment of the present invention.

FIG. 5 is a diagram illustrating an example of a positional relation of the control groups 6 to be controlled by the air-conditioning control apparatus 1 according to the embodiment of the present invention.

FIG. 6 illustrates an example of adjustment times that are calculated by the adjustment time calculation unit 13 according to the embodiment of the present invention.

It is assumed in FIG. 5 that there are two control groups 6 on the floor of the room 3 illustrated in FIG. 1. This floor is surrounded on all four sides by windows. A control group 6a is located in the southwestern part, and a control group 6b adjacent to the control group 6a is located in the northeastern part. Thus, the control group 6a has good insolation. It is also assumed that the control group 6a and the control group 6b are areas of the same size, and that the air conditioners 4 belonging to the control groups 6 are the same in performance.

Because the control group 6a is more affected than the control group 6b by insolation, the room temperature of the control group 6a increases more easily and decreases less easily than does the room temperature of the control group 6b.

Because the control group 6b is less affected than the control group 6a by insolation, the room temperature of the control group 6b increases less easily and decreases more easily than does the room temperature of the control group 6a.

When the adjustment time calculation unit 13 calculates adjustment times in this state, a result as illustrated in FIG. 6, for example, is obtained.

In FIG. 6, the optimal heat ON time t1 is 5 minutes and the optimal heat OFF time t2 is 15 minutes for the control group 6a. The optimal heat ON time t1 is 10 minutes and the optimal heat OFF time t2 is 5 minutes for the control group 6b.

The optimal heat ON time t1 of the control group 6a is shorter than the optimal heat ON time t1 of the control group 6b. The optimal heat OFF time t2 of the control group 6a is longer than the optimal heat OFF time t2 of the control group 6b.

Figure 7:
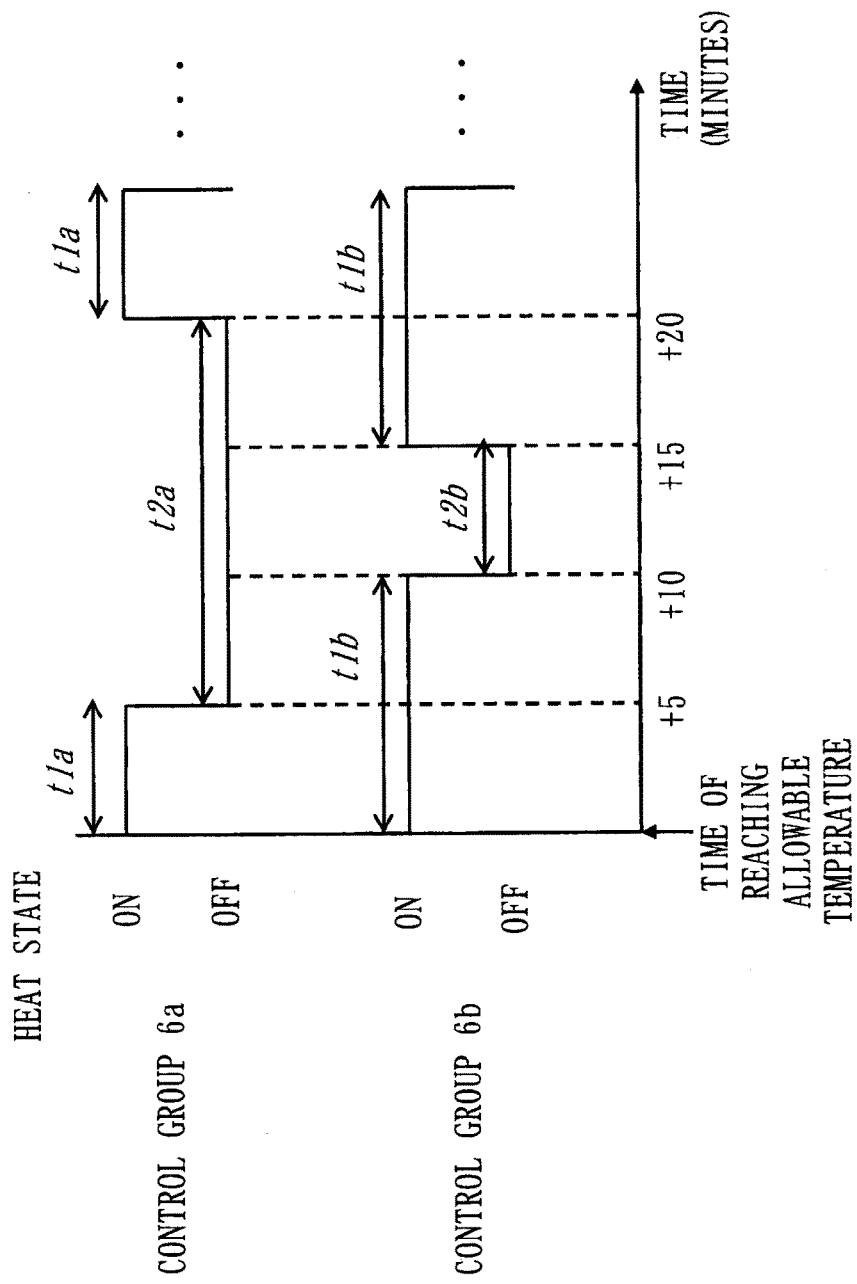
FIG. 7 is a diagram illustrating an example of control schedules that are generated by a schedule generation unit 14 according to the embodiment of the present invention.

When the schedule generation unit 14 generates a control schedule for the control group 6a and a control schedule for the control group 6b based on this result, the control schedules are as illustrated in FIG. 7.

FIG. 7 is a diagram illustrating an example of control schedules that are generated by the schedule generation unit 14 according to the embodiment of the present invention.

It is assumed that FIG. 7 illustrates the control schedules from the timing when the control group 6a and the control group 6b have reached the allowable temperature at the same time using the time information common to each control group 6.

The control schedule of the control group 6a is generated by repeating the following sequence of information. From the time when the allowable temperature has been reached, the time t1a (5 minutes here) is counted in a state in which the air conditioners 4a perform heat exchange (heat ON state). Then, the temperature of the temperature sensor 5a of the control group 6a approaches the desired temperature. Thus, the air conditioners 4a are made to stop heat exchange (heat OFF state), and the time t2a (15 minutes here) is counted in the heat OFF state. Then, the temperature decreases from around the desired temperature to the allowable temperature. Thus, the air conditioners 4a are made to perform heat exchange (heat ON state) again, and the time t1a is counted.

It is assumed that the control schedule of the control group 6b starts counting at the same timing as the control group 6a has reached the allowable temperature and the control group 6b has reached the allowable temperature, using the time information common to the control group 6a and the control group 6b.

The control schedule of the control group 6b is generated by repeating the following sequence of information. From the time when the allowable temperature has been reached at the same time as the control group 6a, the time t1b (10 minutes here) is counted in a state in which the air conditioners 4b perform heat exchange (heat ON state). Then, the temperature sensor 5b of the control group 6b approaches the desired temperature. Thus, the air conditioners 4b are made to stop heat exchange (heat OFF state), and the time t2b (5 minutes here) is counted in the heat OFF state. Then, the temperature decreases from the desired temperature to the allowable temperature. Thus, the air conditioners 4b are made to perform heat exchange (heat ON state) again, and the time t1b is counted.

In this way, using the time information common to each control group 6, the schedule generation unit 14 generates a control schedule for each control group 6 by repeating the following sequence of information from the time when the allowable temperature has been reached: the optimal heat ON time t1, the control timing for the air conditioners 4 to stop heat exchange, the optimal heat OFF time t2, and the control timing for the air conditioners 4 to perform heat exchange.

The optimal heat ON time t1 and the optimal heat OFF time t2 are changed each time the adjustment time calculation unit 13 calculates adjustment times.

The above has described the operation of the schedule generation unit 14.

The air-conditioning centralized controller 2 obtains the control schedule stored in the schedule storage unit 15, and controls the air conditioners 4 on the basis of each control group 6.

The air-conditioning centralized controller 2 controls the air conditioners 4 of each control group 6 based on the control schedule generated as described above. Thus, the air conditioners 4 can be controlled to implement periodic temperature changes between the desired temperature Td and the allowable temperature Td−w.

Figure 8:
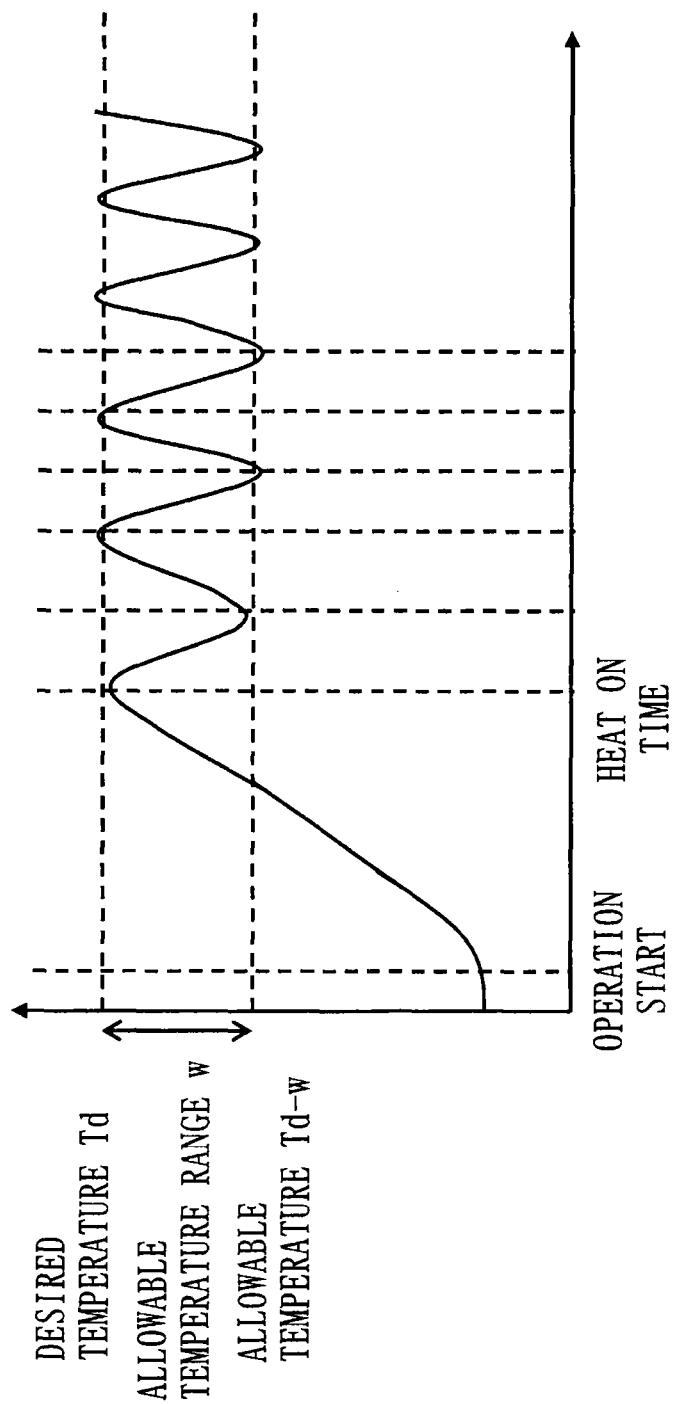
FIG. 8 is a diagram illustrating a temperature state when air conditioners 4 are operated according to the generated control schedules according to the embodiment of the present invention.

FIG. 8 is a diagram illustrating a temperature state when the air conditioners 4 are controlled with the generated control schedules according to the embodiment of the present invention.

When only a general desired temperature Td is provided, as is conventionally the case, the room temperature may exceed the desired temperature as illustrated in FIG. 13. This is because the heat state is stopped by determining that the temperature of the temperature sensor 5 has reached the desired temperature, so that the temperature may exceed the desired temperature due to temperature effects from the air conditioners 4 of each adjacent control group 6 and effects of insolation to the area of each control group 6, people in the room, and heat from equipment.

In this embodiment, however, the adjustment times for changing the room temperature in the allowable temperature range w are calculated taking into account effects of insolation, people, and heat from equipment and temperature effects from other group(s), and the air conditioners are controlled with the control schedule using the adjustment times. Therefore, for example, it is controlled such that the heat OFF state is started before the temperature of the temperature sensor 5 reaches the desired temperature and the heat OFF state is maintained during the calculated adjustment time. Thus, the power consumption of the air conditioners 4 can be reduced compared to when it is controlled such that the heat OFF state is started after the temperature of the temperature sensor 5 has reached the desired temperature.

The operation of the schedule optimization unit 16 will now be described.

Figure 9:
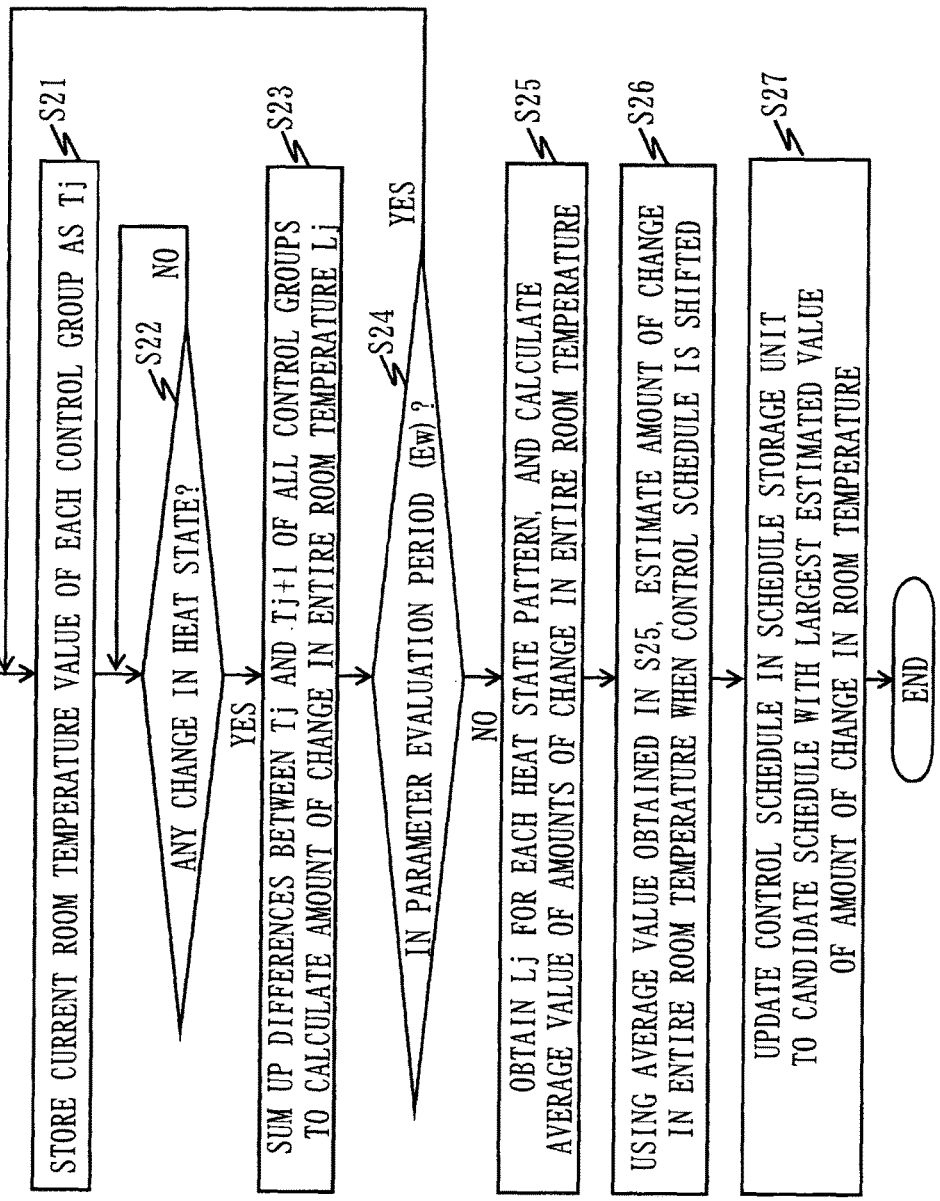
FIG. 9 is a flowchart illustrating the operation of a schedule optimization unit 16 of the air-conditioning control apparatus 1 according to the embodiment of the present invention.

FIG. 9 is a flowchart illustrating the operation of the schedule optimization unit 16 of the air-conditioning control apparatus 1 according to the embodiment of the present invention.

A description will be given herein using a heating operation as an example. The schedule optimization unit 16 operates with arbitrary timing during operation of the air conditioners 4 when a plurality of the control groups 6 are present.

In the schedule optimization unit 16, the following parameters are set.

Ew: parameter evaluation period (minutes), Tj: evaluation start room temperature (° C.), Lj: amount of change in the entire room temperature (amount of change in the room temperature), Lavr: average value of Lj. Note that the suffix j represents a time from the start timing of the parameter evaluation period.

It is assumed that a control schedule for each control group 6 has been generated by the schedule generation unit 14 and stored in the schedule storage unit 15.

It is also assumed that the parameter evaluation period (Ew) is 60 minutes. A method for setting the parameter evaluation period (Ew) will be described later.

At the beginning of the parameter evaluation period (Ew), all the control groups 6 are in the heat ON state, and the following process is performed using the time information common to each control group 6.

First, the schedule optimization unit 16 obtains the current room temperature (temperature measured by the temperature sensor 5) Tj of each control group 6 from the temperature information storage unit 8, and stores it in a temporary storage area (S21).

Then, the schedule optimization unit 16 determines whether or not the heat state of any of the control groups 6 has changed (has changed from the heat ON state to the heat OFF state, or has changed from the heat OFF state to the heat ON state) on a unit time basis (for example, once in 1 minute), using the time information common to each control group 6 (S22).

At the time when the heat state of any of the control groups 6 has changed, a room temperature Tj+1 of each control group 6 is obtained from the temperature information storage unit 8. Then, a difference between the room temperature Tj+1 and the room temperature Tj stored in the temporary storage area is obtained. Further, differences between the room temperatures Tj+1 and Tj of all the control groups 6 in the room are summed up to calculate the amount of change in the entire room temperature Lj (S23).

Then, it is determined whether or not the time when the heat state has changed is in the parameter evaluation period (Ew) (S24).

If it is in the parameter evaluation period (Ew), processing returns to S21.

If it is not in the parameter evaluation period (Ew), the amount of change in the entire room temperature Lj has been calculated for all patterns (combinations) of heat states before a change in the heat state (this is because the parameter evaluation period is set as a period which allows all patterns to be extracted). Thus, using the amount of change in the entire room temperature Lj calculated for each heat state pattern before a change in the heat state, the average value Lavr (amount of change in the room temperature per unit of time) in that pattern is obtained (S25).

Here, the calculation of the amount of change in the entire room temperature Lj and the calculation of the average value Lavr will be described in detail.

For example, it is assumed that adjustment times, namely the optimal heat ON time and the optimal heat OFF time, have been calculated as illustrated in FIG. 6 and control schedules have been generated as illustrated in FIG. 7, for the control group 6a and the control group 6b.

Figure 10:
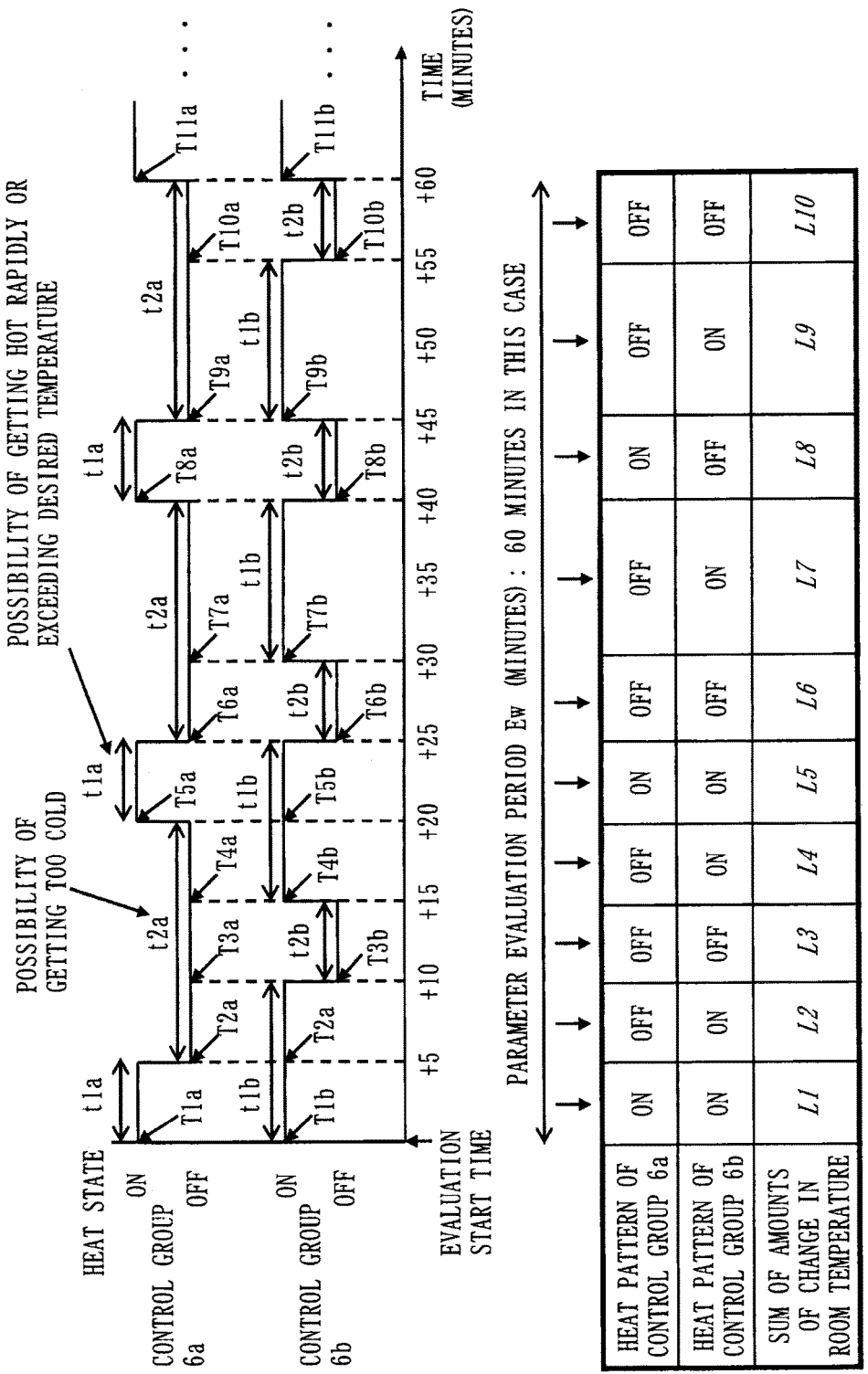
FIG. 10 is an explanatory diagram for calculating the amount of change in the entire room temperature according to the embodiment of the present invention.

FIG. 10 is an explanatory diagram for calculating the amounts of change in the room temperatures of the two control groups (the amount of change in the entire room temperature) according to the embodiment of the present invention.

For the control group 6a, the optimal heat ON time t1a is 5 minutes and the optimal heat OFF time t2a is 15 minutes. For the control group 6b, the optimal heat ON time t1b is 10 minutes, and the optimal heat OFF time t2b is 5 minutes.

When the optimal heat ON time t1a (5 minutes) of the control group 6a has elapsed from the parameter evaluation start time, the control group 6a changes to the heat OFF state. At the time of the change in the heat state of the control group 6a, a room temperature T2a of the control group 6a and a room temperature T2b of the control group 6b are obtained.

At this time, the control group 6b remains in the heat ON state.

Then, a difference between the obtained room temperature T2a of the control group 6a and the room temperature T1a before the change in the heat state is calculated. A difference between the room temperature T2b and the room temperature T1b is also calculated for the control group 6b. Then, a sum L1 of the difference between the room temperatures of the control group 6a and the difference between the room temperatures of the control group 6b is calculated.

The sum L1 is the amount of change in the entire room temperature in the heat state pattern before the change in the heat state of the control group 6a (heat state pattern consisting of the heat ON state of the control group 6a and the heat ON state of the control group 6b).

This can be represented as $L1=(T2a-T1a)+(T2b-T1b)$.

When the optimal heat ON time t2a (10 minutes) of the control group 6b has elapsed from the parameter evaluation start time, the control group 6b changes to the heat OFF state. At the time of the change in the heat state of the control group 6b, a room temperature T3a of the control group 6a and a room temperature T3b of the control group 6b are obtained.

At this time, the control group 6a remains in the heat OFF state.

Then, a difference between the obtained room temperature T3a of the control group 6a and the room temperature T2a before the change in the heat state is calculated. A difference between the room temperature T3b and the room temperature T2b is also calculated for the control group 6b. Then, a sum L2 of the difference between the room temperatures of the control group 6a and the difference between the room temperatures of the control group 6b is calculated.

The sum L2 is the amount of change in the entire room temperature in the heat state pattern before the change in the heat state of the control group 6b (heat state pattern consisting of the heat OFF state of the control group 6a and the heat ON state of the control group 6b).

This can be represented as $L2=(T3a-T2a)+(T3b-T2b)$.

Similarly, the amounts of change in the entire room temperature L3 to L10 are obtained, respectively, each time a change has occurred in the heat state of either of the control group 6a and the control group 6b. When these are the amounts of change in the entire room temperature in the patterns before each change in the heat state, a table as illustrated in FIG. 10 is obtained.

A total of ten Lj values are obtained on a basis of the heat state patterns in the parameter evaluation period Ew of 60 minutes.

In FIG. 10, L3 is the amount of change in the entire room temperature in a pattern consisting of the heat OFF state of the control group 6a and the heat OFF state of the control group 6b when the control group 6b has changed from the heat OFF state to the heat ON state while the control group 6a remains in the heat OFF state. The control group 6b is in the heat OFF state while the control group 6a remains in the heat OFF state. Thus, there is a possibility that the entire room temperature may decrease the most.

L5 is the amount of change in the entire room temperature when the control group 6a and the control group 6b are both in the heat ON state. Thus, there is a possibility that the entire room temperature may increase the most.

Next, with respect to the amounts of change in the entire room temperature Lj obtained in the parameter evaluation period Ew, an average of the amounts of change in the room temperature is calculated for each heat state pattern. For example, an average value of the amounts of change in the entire room temperature is calculated for "2 to the power of 2" patterns of the heat states of the control group 6a and the control group 6b before a change in the heat state, which are {ON and ON}, {ON and OFF}, {OFF and ON}, and {OFF and OFF}. That is, an average value of the amounts of change in the room temperature per unit of time is calculated for "2 to the power of (number of groups)" patterns.

In FIG. 10, for example, the average value Lavr of the amounts of change in the room temperature when the heat states of the control group 6a and the control group 6b are {ON and ON} is (L1+L5)/(5 minutes+5 minutes). Lavr of {ON and OFF} is (L8)/(5 minutes). Lavr of {OFF and ON} is (L2+L4+L7+L9)/(5 minutes+5 minutes+10 minutes+10 minutes). Lavr of {OFF and OFF} is (L3+L6+L10)/(5 minutes+5 minutes+5 minutes).

In this way, each time a change has occurred in the heat state of any of the control groups 6, the amount of change in the entire room temperature is obtained for the heat state pattern before the change in the heat state. Further, the average value Lavr of the amounts of change in the entire room temperature (amount of change in the entire room temperature per unit of time) is calculated for each heat state pattern.

A description will now be given on how to set the parameter evaluation period Ew in order to calculate the amount of change in the room temperature based on a change in the heat state of any of the control groups 6 and for all heat state patterns (4 types in this case).

Figure 11:
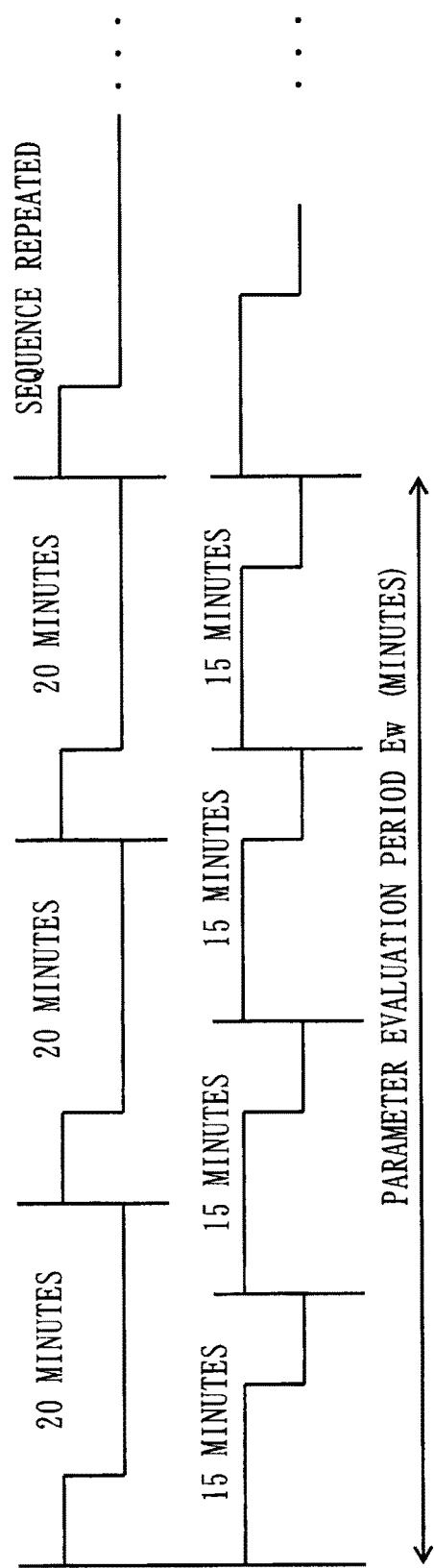
FIG. 11 is an explanatory diagram for setting a parameter evaluation period Ew according to the embodiment of the present invention.

FIG. 11 is an explanatory diagram for setting the parameter evaluation period Ew according to the embodiment of the present invention.

A minimum value of the parameter evaluation period Ew is a least common multiple of sums of the optimal heat ON time t1 and the optimal heat OFF time t2 of all groups.

For example, with the control group 6a and the control group 6b of FIG. 10, a minimum value of the parameter evaluation period Ew is 60 minutes, which is a least common multiple of a total of 20 minutes consisting of the optimal heat ON time t1a (5 minutes) and the optimal heat OFF time t2a (15 minutes) of the control group 6a, and a total of 15 minutes consisting of the optimal heat ON time t1b (10 minutes) and the optimal heat OFF time t2b (5 minutes) of the control group 6b. By setting the parameter evaluation period to 60 minutes or longer, all patterns of the heat states before a change in the heat state of any of the control groups 6 can be extracted.

With three control groups, all heat state patterns can be extracted by setting the parameter evaluation period Ew to a least common multiple of three sums of the optimal heat ON time and the optimal heat OFF time of the three groups.

The above has described the calculation of the amount of change in the entire room temperature Lj and the calculation of the average value Lavr.

The description will now return to the flowchart of FIG. 9.

Using the average value Lavr of the amounts of change in the entire room temperature which is calculated based on a change in the heat state and for each heat state pattern, the amount of change in the entire room temperature is estimated for a candidate schedule which is generated by shifting the control schedule. This estimation is performed for each candidate schedule which is generated by shifting the control schedule (S26).

The generation of a candidate schedule will be described in detail later.

Then, a candidate schedule indicating the largest positive value of the amount of change in the room temperature among the amounts of change in the entire room temperature estimated for all candidate schedules is extracted as an optimal candidate schedule, and the control schedule stored in the schedule storage unit 15 is updated to the extracted candidate schedule (S27).

The extraction of an optimal candidate schedule will be described in detail later.

The above has described the operation of the schedule optimization unit 16.

A method for generating candidate schedules by shifting the control schedule and extracting an optimal candidate schedule from the generated candidate schedules will now be described.

Figure 12:
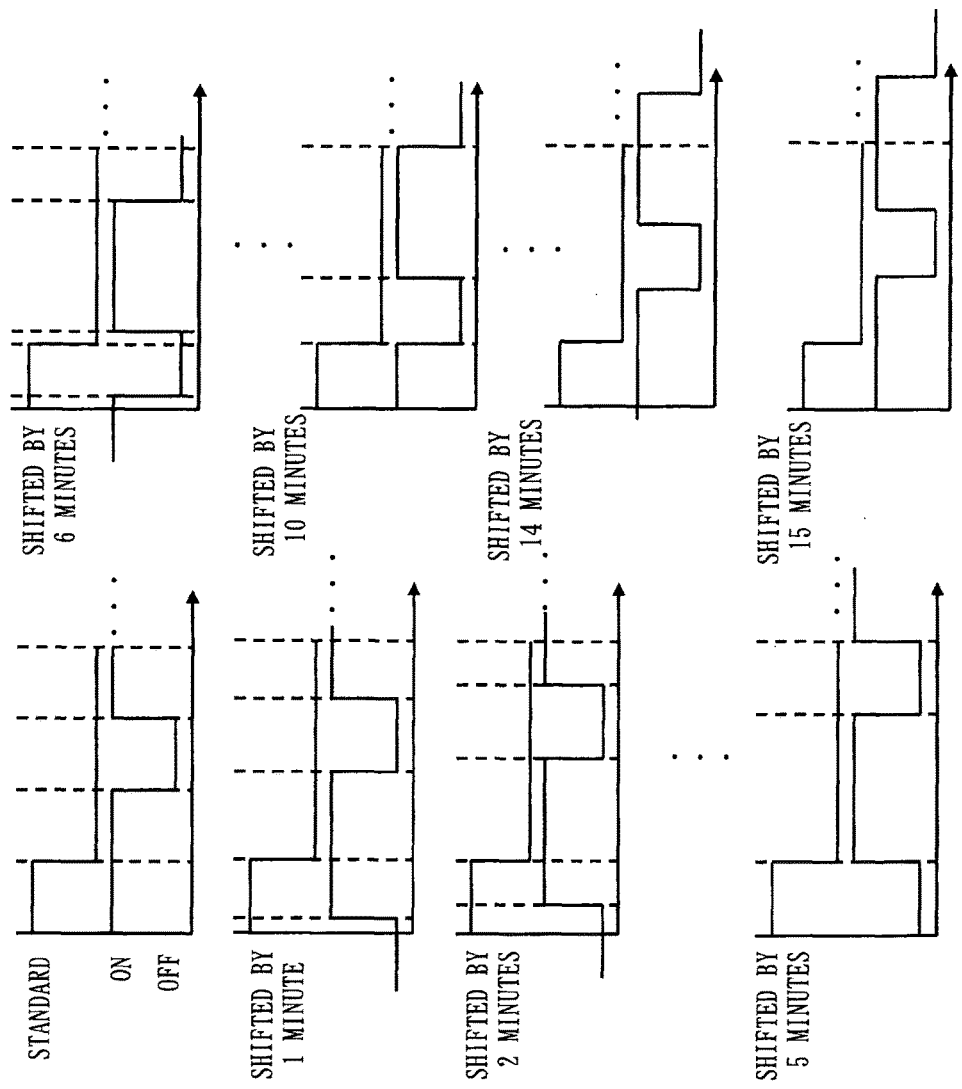
FIG. 12 illustrates an example of candidate schedules that are generated by shifting a control schedule according to the embodiment of the present invention.

FIG. 12 illustrates an example of candidate schedules which are generated by shifting a control schedule according to the embodiment of the present invention.

First, a control schedule generated by the schedule generation unit 14 is used as a standard schedule.

Then, when t is a unit of time for shifting the standard schedule, candidate schedules are generated by fixing the control schedule of one of the control groups 6 and delaying the start time of the heat ON state of the control schedule of another control group 6 by the unit of time t.

In FIG. 12, candidate schedules are generated by setting t to 1 minute.

First, a pair of a control schedule of the control group 6a and a control schedule of the control group 6b generated by the schedule generation unit 14 is set as the standard schedule.

Then, for example, the control schedule of the control group 6a is fixed (is the same control schedule as the standard schedule), and a control schedule of the control group 6b is generated by shifting the start time of the heat ON state of the control group 6b by 1 minute. A pair of the control schedule of the control group 6b generated by shifting by 1 minute and the control schedule of the control group 6a is generated as a candidate schedule 1.

Then, with the control schedule of the control group 6a being fixed, a candidate schedule 2, a candidate schedule 3, . . . , and a candidate schedule 14 are generated by delaying the start time of the heat ON state of the control group 6b by 2 minutes, 3 minutes, . . . , and 14 minutes, respectively. Delaying by 15 minutes results in a candidate schedule which is the same as the standard schedule. After 15 minutes, candidate schedules which are the same as the candidate schedule 1 to the candidate schedule 14 are obtained. Therefore, a candidate schedule 16 is the same as the candidate schedule 1, a candidate schedule 17 is the same as the candidate schedule 2, . . . , and a candidate schedule 59 is the same as the candidate schedule 14.

Then, the amount of change in the entire room temperature is calculated and evaluated for each candidate schedule.

First, the amount of change in the entire room temperature is calculated for the candidate schedule 1.

The start time of the parameter evaluation period (Ew) is t0, and the end time of the parameter evaluation period (Ew) is tw.

Based on the heat state pattern of the control group 6a and the control group 6b at time t0, Lavr of the same heat state pattern calculated in S25 is assigned and is set as the amount of change in the entire room temperature Lavr_0 at time t0.

Based on the heat state pattern of the control group 6a and the control group 6b at time t1 (when 1 minute has elapsed), Lavr of the same heat state pattern calculated in S25 is assigned and is set as the amount of change in the entire room temperature Lavr_1 at time t1.

Similarly, the amount of change in the entire room temperature is calculated up to time tw. The amount of change in the entire room temperature at time tw is set as Lavr_w.

A sum of the amounts of change in the entire room temperature at time t0 to time tw of the standard schedule is set as Lsum_0.

Because the heating operation is used as an example herein, a candidate schedule with the largest amount of change in the entire room temperature among Lsum_0 to Lsum_60 is evaluated and extracted as an optimal candidate schedule.

The above has described the generation of candidate schedules and the extraction of an optimal candidate schedule.

It has been described herein that candidate schedules are generated by shifting by up to 60 minutes of the parameter evaluation period in which all combinations of the heat states can be extracted. Alternatively, because shifting by 15 minutes results in the same schedule as the standard schedule, candidate schedules shifted by up to 14 minutes of one cycle may be generated and the amounts of change in the entire room temperature may be calculated.

Candidate schedules are generated by shifting by 1 minute herein. Alternatively, candidate schedules may be generated by shifting by several minutes. Alternatively, candidate schedules may be generated by shifting by different amounts of time, such as shifting by 1 minute, 4 minutes, and 5 minutes from the timing of each change in the heat state of the control group 6.

In this embodiment, the description has been given using the heating operation as an example. Thus, a candidate schedule with the largest positive temperature change value is extracted. In the case of a cooling operation, a schedule with the largest negative temperature change value is extracted. Alternatively, a candidate schedule whose temperature change value is close to 0 may be extracted.

In this example, real-time values during the operation of the air conditioners 4 are used for calculating Lavr. Alternatively, past temperature history information that is stored in the temperature information storage unit 8 may be used. For example, the control schedule may be updated using accumulated data from the afternoon of the previous day, in order to obtain during the course of the morning a control schedule for the afternoon of the day.

As described above, the schedule optimization unit 16 calculates the amount of change in the entire room temperature for each candidate schedule which is shifted by the unit of time, and extracts a candidate schedule as an optimal control schedule based on the calculated amount of change in the entire room temperature. Thus, comfort can be maintained by avoiding overlapping of timings of the heat ON state over a prolonged period of time and overlapping of timings of the heat OFF state over a prolonged period of time between a plurality of control groups, and by avoiding large changes in the entire room temperature.

The air conditioners 4 are controlled with the adjustment times which are calculated by taking into account temperature effects from the air conditioners 4 of each adjacent control group 6, an increase in the temperature (or a decrease in the temperature) due to effects of insolation into the area of each control group 6, people in the room, and heat from equipment. Thus, the power consumption of the air conditioners 4 can be reduced.

The times for the heat ON state and the heat OFF state can be set automatically with the calculated adjustment times, so that a burden of setting work can be reduced.

INDUSTRIAL APPLICABILITY

As described above, the air-conditioning control apparatus, the air-conditioning control system, and the air-conditioning control method for controlling air conditioners according to the present invention calculate an adjustment time in which the air conditioners are controlled to adjust the temperature of the area to be adjusted by the air conditioners to between a desired temperature and an allowable temperature, and control the air conditioners based on the adjustment time, so that the air conditioners can be made to stop heat exchange before the desired temperature is reached. Thus, power consumption can be reduced while avoiding large changes in the entire room temperature.

REFERENCE SIGNS LIST

1: air-conditioning control apparatus, 2: air-conditioning centralized controller, 3: room, 4: air conditioner, 5: temperature sensor, 6: control group, 7: temperature measurement unit, 8: temperature information storage unit, 9: desired temperature setting unit, 10: desired temperature storage unit, 11: allowable temperature range setting unit, 12: allowable temperature range storage unit, 13: adjustment time calculation unit, 14: schedule generation unit, 15: schedule storage unit, 16: schedule optimization unit

The invention claimed is:

1. An air-conditioning control apparatus comprising:
a temperature measurement unit that obtains a temperature of a temperature sensor installed in a same area as an air conditioner, based on time information which is set;
an adjustment time calculation unit that calculates an adjustment time in which the air conditioner is controlled to adjust the temperature obtained by the temperature measurement unit to between a desired temperature which is set and an allowable temperature which is set as an allowable deviation from the desired temperature, the adjustment time is based on a time in which the air conditioner performs heat exchange and a time in which the air conditioner does not perform heat exchange between the desired temperature and the allowable temperature; and
a schedule generation unit that generates a control schedule for controlling the air conditioner, based on the adjustment time calculated by the adjustment time calculation unit,
wherein as the adjustment time, a first adjustment time in which the air conditioner performs heat exchange from the allowable temperature before reaching the desired temperature to the desired temperature is calculated, and a second adjustment time in which the air conditioner does not perform heat exchange from the desired temperature to the allowable temperature after reaching the desired temperature is calculated.

2. The air-conditioning control apparatus according to claim 1,
wherein as the adjustment time, a third adjustment time in which the air conditioner performs heat exchange from the allowable temperature before reaching the desired temperature to the allowable temperature exceeding the desired temperature is calculated, and a fourth adjustment time in which the air conditioner does not perform heat exchange from the allowable temperature after reaching the desired temperature to the allowable temperature before reaching the desired temperature is calculated.

3. The air-conditioning control apparatus according to claim 1, further comprising:
a temperature information storage unit that stores the temperature obtained by the temperature measurement unit, the time information at which the temperature is obtained, and area information on the area where the temperature sensor is installed,
wherein the adjustment time calculation unit calculates the adjustment time on a basis of the area, using the temperature, the time information, and the area information that are stored in the temperature information storage unit.

4. The air-conditioning control apparatus according to claim 1, further comprising:
a schedule optimization unit that updates the control schedule generated by the schedule generation unit,
wherein the schedule optimization unit calculates an amount of change in a temperature of an area of a first air conditioner and an amount of change in a temperature of an area of a second air conditioner, at an interval in which a change occurs in a heat exchange state of at least one of the first air conditioner which is controlled with a first control schedule and the second air conditioner which is installed in an area adjacent to the area of the first air conditioner and is controlled with a second control schedule, and updates the control schedule based on the amounts of change in the temperatures that are calculated.

5. An air-conditioning control system comprising:
an air-conditioning control apparatus including
a temperature measurement unit that obtains a temperature of a temperature sensor installed in a same area as an air conditioner, based on time information which is set;
an adjustment time calculation unit that calculates an adjustment time in which the air conditioner is controlled to adjust the temperature obtained by the temperature measurement unit to between a desired temperature which is set and an allowable temperature which is set as an allowable deviation from the desired temperature, the adjustment time is based on a time in which the air conditioner performs heat exchange and a time in which the air conditioner does not perform heat exchange between the desired temperature and the allowable temperature; and
a schedule generation unit that generates a control schedule for controlling the air conditioner, based on the adjustment time calculated by the adjustment time calculation unit; and
an air-conditioning centralized controller that controls the air conditioner based on the control schedule generated by the air-conditioning control apparatus,
wherein as the adjustment time, a first adjustment time in which the air conditioner performs heat exchange from the allowable temperature before reaching the desired temperature to the desired temperature is calculated, and a second adjustment time in which the air conditioner does not perform heat exchange from the desired temperature to the allowable temperature after reaching the desired temperature is calculated.

6. An air-conditioning control method for generating a control schedule for controlling an air conditioner by an air-conditioning control apparatus, the air-conditioning control method comprising:
obtaining a temperature of a temperature sensor installed in a same area as the air conditioner, based on time information which is set;
calculating an adjustment time in which the air conditioner is controlled to adjust the temperature obtained to between a desired temperature which is set and an allowable temperature which is set as an allowable deviation from the desired temperature, the adjustment time is based on a time in which the air conditioner performs heat exchange and a time in which the air conditioner does not perform heat exchange between the desired temperature and the allowable temperature; and
generating a control schedule for controlling the air conditioner, based on the adjustment time calculated,
wherein as the adjustment time, a first adjustment time in which the air conditioner performs heat exchange from the allowable temperature before reaching the desired temperature to the desired temperature is calculated, and a second adjustment time in which the air conditioner does not perform heat exchange from the desired temperature to the allowable temperature after reaching the desired temperature is calculated.

* * * * *